US008692836B2

(12) United States Patent
Schuette

(10) Patent No.: US 8,692,836 B2
(45) Date of Patent: Apr. 8, 2014

(54) COMPUTER SYSTEM AND PROCESSING METHOD UTILIZING GRAPHICS PROCESSING UNIT WITH ECC AND NON-ECC MEMORY SWITCHING CAPABILITY

(75) Inventor: Franz Michael Schuette, Colorado Springs, CO (US)

(73) Assignee: OCZ Technology Group, Inc., San Jose, CA (US)

( * ) Notice: Subject to any disclaimer, the term of this patent is extended or adjusted under 35 U.S.C. 154(b) by 834 days.

(21) Appl. No.: 12/900,596

(22) Filed: Oct. 8, 2010

(65) Prior Publication Data
US 2011/0084978 A1    Apr. 14, 2011

Related U.S. Application Data

(60) Provisional application No. 61/249,762, filed on Oct. 8, 2009.

(51) Int. Cl.
*G09G 5/39* (2006.01)
*G06T 1/60* (2006.01)

(52) U.S. Cl.
USPC .......................................... 345/531; 345/530

(58) Field of Classification Search
USPC ................................................... 345/530, 531
See application file for complete search history.

(56) References Cited

U.S. PATENT DOCUMENTS

2005/0035972 A1* 2/2005 Chang et al. .................. 345/531
2005/0140685 A1* 6/2005 Garg ............................. 345/543

* cited by examiner

*Primary Examiner* — Jacinta M Crawford
(74) *Attorney, Agent, or Firm* — Hartman Global IP Law; Gary M. Hartman; Domenica N. S. Hartman

(57) ABSTRACT

Computer systems and methods that utilize a GPU whose operation is able to switch between ECC and non-ECC memory operations on demand. The computer system includes a graphics processing unit and a memory controller and local memory that are functionally integrated with the graphics processing unit. The memory controller has at least two operating modes comprising a first memory access mode that uses error checking and correction when accessing the local memory, and a second memory access mode that does not use error checking and correction when accessing the local memory. The memory controller is further operable to switch the operation of the memory controller between the first and second memory access modes without rebooting the computer system.

20 Claims, 1 Drawing Sheet

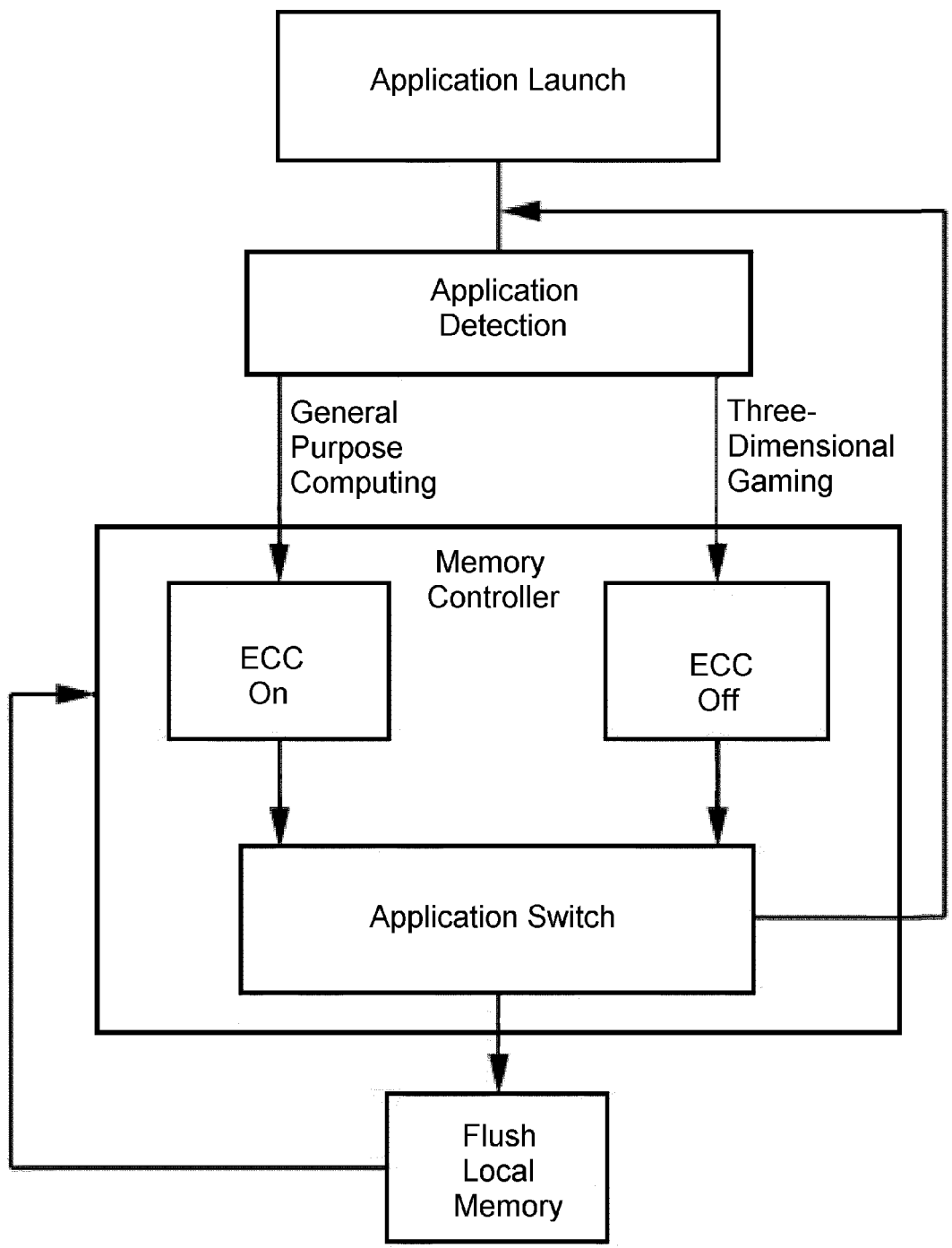

COMPUTER SYSTEM AND PROCESSING METHOD UTILIZING GRAPHICS PROCESSING UNIT WITH ECC AND NON-ECC MEMORY SWITCHING CAPABILITY

CROSS REFERENCE TO RELATED APPLICATIONS

This application claims the benefit of U.S. Provisional Application No. 61/249,762, filed Oct. 8, 2009, the contents of which are incorporated herein by reference.

BACKGROUND OF THE INVENTION

The present invention generally relates to graphics processing units and their use for general purpose computing. More specifically, the invention relates to methods for reconfiguring different memory operation modes, notably, an error checking and correction (ECC) mode and a non-ECC mode on an application-dependent basis.

Graphics processors have evolved from relatively simple video processors to extremely powerful, fully programmable graphics processing units (GPU) or visual processing units (VPU). GPUs and VPUs (hereinafter, GPUs) were developed for three-dimensional (3D) "gaming" applications, that is, applications that rely on a representation of a highly complex 3D environment for entertainment purposes on the computer screen, within which a user ("gamer") can navigate in real time. Early versions of so-called "graphics adapters" only processed the geometry setup and painting of the surfaces with textures. However, contemporary games now contain much more complex modes of representing a virtual reality through enabling mini-programs called shaders that, for example, simulate swaying grass or leaves, or else glass shattering and pyrotechnic effects such as flames and smoke. All the above mentioned effects are processed almost exclusively on modern GPUs. In view of the above, 3D computer games can be generally described as software for entertainment purposes whose operation relies on a GPU to accelerate the process of drawing complex scenes on a display in realtime, such as applications that run on the Microsoft DirectX® application programming interface (API). A major factor for handling the massive computational load in 3D-gaming applications is the extremely high level of parallelism, meaning that contemporary GPUs typically contain several hundreds of execution units. In addition, averaging of values and assumption-based creation of place holders can create smoother images at the expense of precision rendering of the data.

GPUs are increasingly being used also for "general purpose computing" applications, in other words, applications requiring computations traditionally handled by a central processing unit (CPU), including data base mining, semantic analysis of text documents, and filter executions in applications such as Adobe Photoshop®, a graphics editing program available from Adobe Systems Incorporated. In this case, the software is optimized to take advantage of the parallel processing power of GPUs. Three-dimensional (3D) computer-aided design (CAD) applications can also be said to broadly fall under this definition of general purpose computing since, in most cases, they are limited by the geometry processing, which is done on the CPU. Moreover, CAD applications are used to perform simulations of, for example, thermal conductance, fluid flow and their regulation, and to analyze the structural integrity of complex designs, all of which require extreme accuracy of all computational steps. Because of the massive number of parallel processing units, general purpose computing applications that are capable of taking advantage of GPUs often run orders of magnitude faster on these highly specialized GPUs than on general purpose mainstream CPUs, such as those commercially offered by Advanced Micro Devices, Inc. (AMD) and Intel Corporation.

A prerequisite for extreme performance in suitable applications is the availability of large memory bandwidth. Typical desktop CPUs have one or two 64-bit memory channels available supporting up to 1600 Mbps, resulting in a theoretical memory peak bandwidth of 12800 MB/sec per channel. Because of arbitration between physical banks (ranks) and other latency issues, the maximum achievable bandwidth in synthetic benchmarks is at best some 60% of the theoretical bandwidth, topping out at approximately 16 MB/sec for dual channel configurations. In contrast, GPUs typically use a point to point memory bus as wide as 512 bit and run specialized graphics memory (GDRAM, GDDRx) at ultra high frequencies of up to 5 Gbps, achieving as much as 320 GB/sec memory bandwidth.

In the case of 3D gaming applications, data are typically non-recurrent, that is, as scenes are rendered, data are being used to, for example, texture a surface, which is then discarded with the next frame. Consequently, a single bit error in, for example, a texture may result in a single pixel having a wrong color and that particular pixel is only displayed for the duration of one frame, which is typically less than 1/60 of a second. Only in the rarest of cases will such a pixel deviation even become obvious to a gamer. However, in the context of general-purpose computing on GPUs (general purpose GPUs or GPGPUs; also referred to as GPGP or $GP^2$), it is paramount that critical applications need to be aware of any memory errors, whether they are hard errors or soft errors, for example, the flipping of a single bit caused by a cosmic ray. If a soft error occurs in a data base application and causes a shift in a floating point or decimal, the consequences can be catastrophic since the system will not be aware of the error and the corrupted data entry can proliferate throughout the entire database. In desktop computing (including servers) this problem has been addressed by using error checking and correction (ECC) algorithms (also known as error correction code), such as Reed Solomon (R-S) or Bose-Ray-Chaudhuri-Hoquenhem (BCH), which rely on generating a checksum of the data during writes and then cross-referencing the checksum on subsequent reads with a recalculated checksum of the data.

ECC memory implementations have been used for decades and are a mandatory feature in the server space where soft errors must be avoided at all cost since they can cause database corruption or, in the extreme case, used to launch viruses. However, ECC implementations come with a performance hit because every transaction requires the calculation of the checksum and a comparison with the previously stored checksum of the data set. In the case of system memory, this performance hit is relatively minor, typically in the order of about 3 to about 5% bandwidth reduction. However, with increasing memory data rate and bandwidth, the load on the ECC unit increases and some projections for memory subsystems, such as the onboard local memory of a high-end graphics cards, estimate a performance degradation of as much as about 40 to about 70%.

In high-end graphics cards used primarily for computer 3D gaming applications, memory bandwidth is extremely crucial for performance, especially if image enhancing routines like anti-aliasing are carried out. Anti-aliasing uses averaging of different sets of pixels for the purpose of reducing a jaggedness of diagonal lines and "crawling" and "shimmering" effects. In such scenarios, ECC is largely irrelevant since a soft error would primarily have the effect of changing the color value of a single pixel in one frame, an error that is typically not noticeable at all. However, if the same graphics card is used for general purpose computing, ECC becomes absolutely mandatory.

BRIEF DESCRIPTION OF THE INVENTION

The present invention provides computer systems and methods that utilize a GPU whose operation is able to switch between ECC and non-ECC memory operations on demand.

According to a first aspect of the invention, a computer system is provided that includes a graphics processing unit and a memory controller and local memory that are functionally integrated with the graphics processing unit. The memory controller has at least two operating modes comprising a first memory access mode that uses error checking and correction when accessing the local memory, and a second memory access mode that does not use error checking and correction when accessing the local memory. The memory controller is further operable to switch the operation of the memory controller between the first and second memory access modes without rebooting the computer system.

Another aspect of the invention is a method of using the memory controller described above to switch between the first and second memory access modes without rebooting the computer system.

According to yet another aspect of the invention, a method is provided that uses a computer system comprising a graphics processing unit and a memory controller and local memory that are functionally integrated with the graphics processing unit. The method includes launching a software application, detecting whether the application is a general purpose computing application or a 3D gaming application, and causing the memory controller to operate in one of at least two operating modes comprising a first memory access mode that uses error checking and correction when accessing the local memory and a second memory access mode that does not use error checking and correction when accessing the local memory. The memory controller operates in the first memory access mode if the application is a general purpose computing application or a 3D CAD application, and operates in the second memory access mode if the application is a 3D gaming application.

A significant advantage of this invention is the ability to run 3D gaming and general purpose computing software on a computer system having a single graphics card, and the ability to perform memory accesses in an ECC or non-ECC mode depending on whether a 3D gaming application or a general purpose computing application is running on the system. In effect, using the same hardware, the computer system is operable to turn ECC "On" or "Off" in order to match the requirements of 3D gaming and general purpose computing applications. In particular, for a 3D gaming application, memory accesses of the local memory on the graphics card can be performed with ECC disabled, while ECC can be enabled for general purpose computing or specialized applications, including 3D applications such as CAD.

Other aspects and advantages of this invention will be better appreciated from the following detailed description.

BRIEF DESCRIPTION OF THE DRAWINGS

FIG. 1 shows a flow diagram that depicts the launching of an application, wherein a memory controller is enabled to switch between a 3D gaming mode (without ECC) and a general purpose computing mode (with ECC), in accordance with an embodiment of the present invention.

DETAILED DESCRIPTION OF THE INVENTION

FIG. 1 schematically illustrates a process of launching a software application in a computer system in accordance with an embodiment of the present invention. The process utilizes a GPU installed in the computer system, for example, on a graphics card installed in the computer system that may also contain a conventional CPU. Launching an application to run on the GPU initiates a decision as to whether the GPU is to operate in one of at least two different operating modes, and more particularly one of at least two memory access modes used by a memory controller that is functionally integrated with the GPU to access local memory that is also functionally integrated with the GPU. The local memory can be, for example, onboard local memory (generally referred to as local frame buffer, or LFB) on a graphics card on which the GPU is mounted. The process further entails using the memory controller to switch to the appropriate access mode as necessary, based on the type of application being launched. The GPU, memory controller and memory can be of any suitable type commercially available or developed in the future. In particular, the hardware necessary for the memory controller to perform the decision and switching operations are well known. For instance, existing graphics cards are capable of switching between 2D (desktop display) and 3D gaming modes and therefore, from a software and hardware perspective, this type of distinction should be well understood by those skilled in the art.

A first of the memory access modes is referred to herein as a general purpose computing mode, and preferably uses error checking and correction (ECC) for access of the local memory. A second of the memory access modes is referred to herein as a 3D gaming mode, and does not use ECC for accessing the local memory. The decision as to which mode is selected for the operation of the GPU can employ, for example, the DirectX API that enables 3D mode, or can be based on whether the application is listed in the config.ini file of the driver package to enable a 3D-gaming profile. In other words, a software entry in the application being launched or in the driver for the GPU can be used to decide whether the GPU is to operate in the 3D gaming mode or the general purpose computing mode. Ultimately, the decision as to which mode is selected preferably depends on the type of application being launched. According to a preferred aspect of the invention, the 3D gaming mode is selected if a 3D gaming application is detected, which as used herein refers to software whose operation requires a processing unit to accelerate the process of drawing complex scenes on a display in realtime, examples of which include applications that run on the Microsoft DirectX® API. On the other hand, the general purpose computing mode is selected if a general purpose computing application is detected, which as used herein refers to software requiring computations traditionally handled by a central processing unit (CPU) due to with high demands on data integrity, nonlimiting examples of which include applications that perform data base mining, semantic analysis of text documents, filter executions, and computer-aided design (CAD) applications requiring high precision 3D-representations of designs and simulations.

Once the decision or choice of mode has been made, the memory controller performs the switching operation to enable the selected operating mode. According to a preferred aspect of the invention, ECC is enabled (ECC operating mode) if a general purpose computing application is detected, whereas in the case of a gaming application a non-ECC operating mode is selected, wherein either ECC is turned off altogether or the memory controller switches to an error detection mode that carries a far lower overhead than ECC. When the application is terminated, the local memory, for example the local frame buffer (LFB), is preferably flushed. This allows the memory controller to reconfigure its mode of operation in the event the user launches another application necessitating the choice between the ECC and non-ECC operating modes. For example, a 256-bit wide memory bus can be reconfigured to use an extra or redundant 32-bit path for storing and accessing the ECC data if needed, and this "ECC path" can be disabled if data integrity is not mandatory, for example, in gaming applications. A slightly different possibility is to configure the memory bus such that in general purpose computing applications requiring ECC, a portion of the memory data bus is reconfigured to accommodate the ECC data. This may require the disabling of a fraction of the GPU's execution units or their reconfiguration as an ECC engine. Notably, the switching capability provided by the memory controller can be performed without rebooting the computer system.

In another embodiment of the invention, a power-saving capability is provided by adapting the memory controller to switch to the non-ECC operating mode when the GPU is only being used for desktop display. If a gaming application is launched, the operation of the GPU in the non-ECC operating mode avoids the need to reconfigure the memory controller. In the event that a GPU-based general purpose computing application is launched, the memory controller automatically switches the operation of the GPU to its ECC operating mode.

While the invention has been described in terms of a specific embodiment, it is apparent that other forms could be adopted by one skilled in the art. For example, while certain components are preferred for the adaptive GPU of this invention, it is foreseeable that functionally-equivalent components could be used or subsequently developed to perform the intended functions of the disclosed components. Therefore, the scope of the invention is to be limited only by the following claims.

The invention claimed is:

1. A computer system comprising a graphics processing unit and a memory controller and local memory functionally integrated with the graphics processing unit, at least the graphics processing unit and the local memory being located on a graphics card, the memory controller having at least two operating modes comprising a first memory access mode that uses error checking and correction when accessing the local memory, and a second memory access mode that does not use error checking and correction when accessing the local memory, the memory controller being further operable to switch the operation of the memory controller between the first and second memory access modes without rebooting the computer system.

2. The computer system of claim 1, wherein the memory controller is adapted to flush the contents of the local memory prior to switching between the first and second memory access modes.

3. The computer system of claim 1, wherein the memory controller is adapted to switch between the first and second memory access modes when initiated by an application running on the computer system.

4. The computer system of claim 3, wherein the memory controller is adapted to switch between the first and second memory access modes based on a type of the application running on the computer system.

5. The computer system of claim 1, wherein the memory controller is adapted to use the first memory access mode for general purpose computing or 3D CAD applications, and is adapted to use the second memory access mode for 3D gaming applications.

6. The computer system of claim 1, wherein the memory controller has a redundant memory data path that is activated in the first memory access mode to store error checking and correction data and is disabled in the second memory access mode.

7. The computer system of claim 1, wherein the memory controller is configured to use a portion of a data path used in the second memory access mode as an error checking and correction data path for storing error checking and correction data in the first memory access mode.

8. A method comprising using the memory controller of claim 1 to switch between the first and second memory access modes without rebooting the computer system.

9. The method of claim 8, further comprising flushing the contents of the local memory prior to switching between the first and second memory access modes.

10. The method of claim 8, wherein switching between the first and second memory access modes is initiated by an application running on the computer system.

11. The method of claim 10, wherein the first memory access mode is used if the application is a general purpose computing application or a 3D CAD application and the second memory access mode is used if the application is a 3D gaming application.

12. The computer system of claim 10, wherein switching between the first and second memory access modes is based on a type of the application running on the computer system.

13. A method of using a computer system comprising a graphics processing unit and a memory controller and local memory functionally integrated with the graphics processing unit, at least the graphics processing unit and the local memory being located on a graphics card, the method comprising:
    launching a software application;
    detecting whether the application is a general purpose computing application or a 3D gaming application; and
    causing the memory controller to operate in one of at least two operating modes comprising a first memory access mode that uses error checking and correction when accessing the local memory and a second memory access mode that does not use error checking and correction when accessing the local memory, the memory controller operating in the first memory access mode if the application was detected to be a general purpose computing application or a 3D CAD application, the memory controller operating in the second memory access mode if the application was detected to be a 3D gaming application.

14. The method of claim 13, further comprising switching the operation of the memory controller between the first and second memory access modes without rebooting the computer system.

15. The method of claim 14, further comprising flushing the contents of the local memory prior to switching between the first and second memory access modes.

16. The method of claim 15, wherein switching from the second memory access mode to the first memory access mode includes activating a redundant memory data path for error checking and correction data.

17. The method of claim 15, wherein switching from the second memory access mode to the first memory access mode includes disabling a portion of a memory data path used in the second memory access mode, and then re-enabling the portion of the memory data path as an error checking and correction data path for storing error checking and correction data in the first memory access mode.

18. The method of claim 17, further comprising reconfiguring an execution unit of the graphics processing unit as error checking and correction engine.

19. The method of claim 13, wherein the detecting step comprises using a software entry in the application to determine whether the memory controller is caused to operate in the first or second memory access mode.

20. The method of claim 13, wherein the detecting step comprises using a software entry in a driver of the graphics processing unit to determine whether the memory controller is caused to operate in the first or second memory access mode.

* * * * *